US008474486B2

(12) United States Patent
Cyrot

(10) Patent No.: US 8,474,486 B2
(45) Date of Patent: Jul. 2, 2013

(54) ACTUATOR SYSTEM

(75) Inventor: Luc P. Cyrot, Mission Viejo, CA (US)

(73) Assignee: Parker-Hannifan Corporation, Cleveland, OH (US)

( * ) Notice: Subject to any disclaimer, the term of this patent is extended or adjusted under 35 U.S.C. 154(b) by 1212 days.

(21) Appl. No.: 12/350,479

(22) Filed: Jan. 8, 2009

(65) Prior Publication Data

US 2009/0173901 A1 Jul. 9, 2009

Related U.S. Application Data

(60) Provisional application No. 61/019,654, filed on Jan. 8, 2008.

(51) Int. Cl.
*B64C 13/40* (2006.01)
*F15B 13/02* (2006.01)

(52) U.S. Cl.
USPC .................... 137/625.64; 244/99.5; 244/99.6; 244/99.2; 137/625.63; 91/461

(58) Field of Classification Search
USPC .................... 244/99.2, 99.3, 99.4, 99.5, 99.6, 244/99.7, 99.9; 91/461; 137/625.63, 625.64; 251/59
See application file for complete search history.

(56) References Cited

U.S. PATENT DOCUMENTS

| | | | | |
|---|---|---|---|---|
| 2,466,041 | A * | 4/1949 | Peoples, Jr. et al. | 91/38 |
| 3,106,938 | A * | 10/1963 | Gordon | 137/625.68 |
| 3,112,902 | A * | 12/1963 | Kongelbeck | 244/99.7 |
| 3,143,127 | A * | 8/1964 | Frost | 137/116.3 |
| 3,552,433 | A * | 1/1971 | Mason | 91/461 |
| 3,574,311 | A * | 4/1971 | Fairbanks | 137/625.68 |
| 3,696,836 | A | 10/1972 | Bauer | |
| 4,310,143 | A * | 1/1982 | Determan | 137/625.64 |
| 4,426,911 | A * | 1/1984 | Robinson et al. | 244/99.7 |
| 4,664,135 | A * | 5/1987 | Hayner | 137/625.64 |
| 4,819,543 | A * | 4/1989 | Leinen | 91/465 |
| 5,067,687 | A | 11/1991 | Patel et al. | |
| 5,178,359 | A | 1/1993 | Stobbs et al. | |
| 5,271,371 | A * | 12/1993 | Meints et al. | 137/625.64 |
| 5,522,301 | A * | 6/1996 | Roth et al. | 91/461 |
| 6,786,236 | B2 * | 9/2004 | Jansen | 137/625.64 |
| 7,210,502 | B2 * | 5/2007 | Fuller et al. | 137/625.64 |
| 7,284,471 | B2 * | 10/2007 | Jacobsen et al. | 91/457 |
| 2005/0151011 | A1 * | 7/2005 | Tartaglia et al. | 244/110 A |
| 2006/0130914 | A1 * | 6/2006 | Barber | 137/625.64 |
| 2006/0137519 | A1 * | 6/2006 | Jacobsen et al. | 91/461 |
| 2007/0157979 | A1 * | 7/2007 | Vonderwell | 137/625.64 |
| 2008/0110329 | A1 * | 5/2008 | Jacobsen et al. | 91/461 |

FOREIGN PATENT DOCUMENTS

JP 63130980 6/1988

* cited by examiner

*Primary Examiner* — Michael Carone
*Assistant Examiner* — Steven Hawk
(74) *Attorney, Agent, or Firm* — Renner, Otto, Boisselle & Sklar LLP

(57) ABSTRACT

An actuator system (14) comprising a valve assembly (40) having an inner spool (50), an outer spool (60), and a sleeve (70). An assembly (80) directly drives the inner spool (50) to move it relative to the outer spool (60), and thereby hydro-mechanically causes the outer spool (60) to move relative to the sleeve (70). A control assembly (90) provides current input to the drive assembly (80), which converts current input into mechanical motion. The control assembly (90) senses the position of the inner spool (50) and regulates current in accordance with the sensed position.

20 Claims, 11 Drawing Sheets

ACTUATOR SYSTEM

RELATED APPLICATION

This application claims priority under 35 U.S.C. §119(e) to U.S. Provisional Patent Application No. 61/019,654 filed on Jan. 8, 2008. The entire disclosure of this provisional application is hereby incorporated by reference. If incorporated-by-reference subject matter is inconsistent with subject matter expressly set forth in the written specification (and/or drawings) of the present disclosure, the latter governs to the extent necessary to eliminate indefiniteness and/or clarity-lacking issues.

FIELD

An actuator system comprising a cylinder assembly mechanically coupled to a control-surface component and a valve assembly that allows selective supply and return of fluid to thereby control the position of the component.

BACKGROUND

An aircraft commonly comprises control-surface components (e.g., stabilizers, rudders, elevators, flaps, ailerons, spoilers, slats, etc.) that are strategically moved during flight among a plurality of positions, and actuator systems can be employed to control such movement. An actuator system can comprise a cylinder assembly mechanically coupled to the control-surface component and a valve assembly that allows selective supply and return of fluid from the cylinder chambers to extend and retract the piston. Predictable movement of aircraft control-surface components is crucial in flight, whereby an actuating system must consistently and dependably perform in a variety of operating conditions (e.g., temperature, altitude, etc.). And as important as accuracy is, it seldom can be achieved at the penalty of excessive weight and/or size in aerospace applications.

SUMMARY

An actuator system is provided that can consistently and dependably perform in a variety of operating conditions, without the penalty of excessive weight and/or size. The actuator system can comprise a valve assembly with concentric spools, with an inner spool being directly driven by a motor that converts current input into mechanical movement. The outer (larger) spool is not directly driven, but instead is hydromechanically caused to move upon movement of the inner spool. The direct drive assembly is controlled by an assembly that relies upon sensed position data (and its comparison to pre-calibrated position data) to regulate current.

DRAWINGS

FIG. 1 shows an aircraft having flight-control-surface components, which may be selectively moved with the actuator system.

FIGS. 2A-2C schematically show the interaction between a flight-control-surface component and the actuator system.

DESCRIPTION

Figure 1:
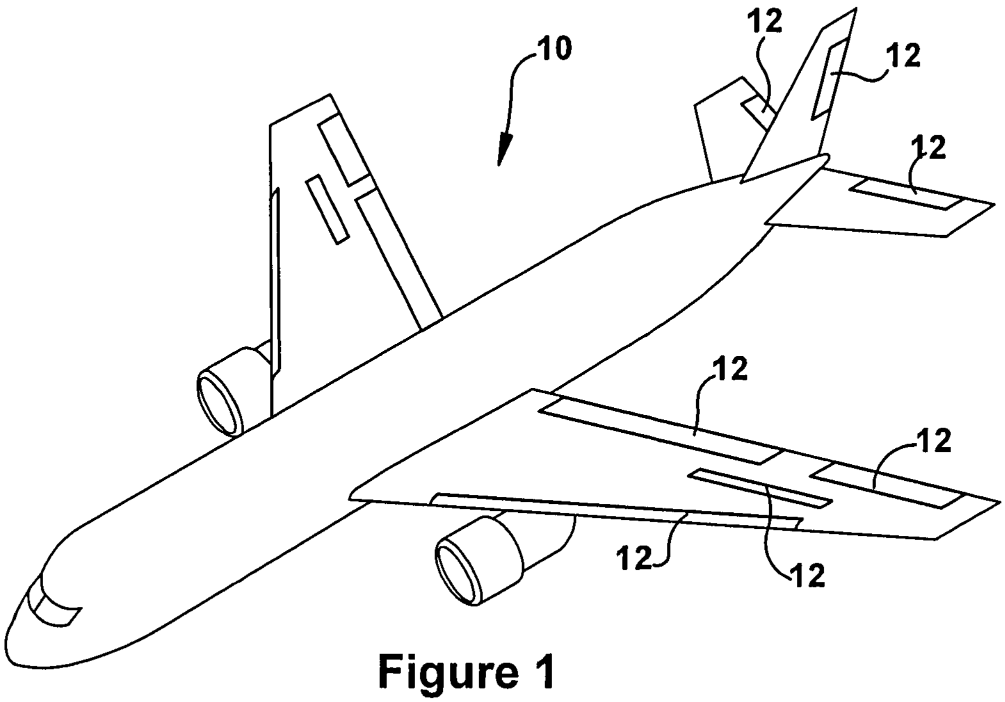

As shown in FIG. 1, an aircraft 10 can have flight-control-surface components 12 (e.g., stabilizers, rudders, elevators, flaps, ailerons, spoilers, slats, etc.) that are strategically moved during flight among a plurality of positions.

Figure 2A:
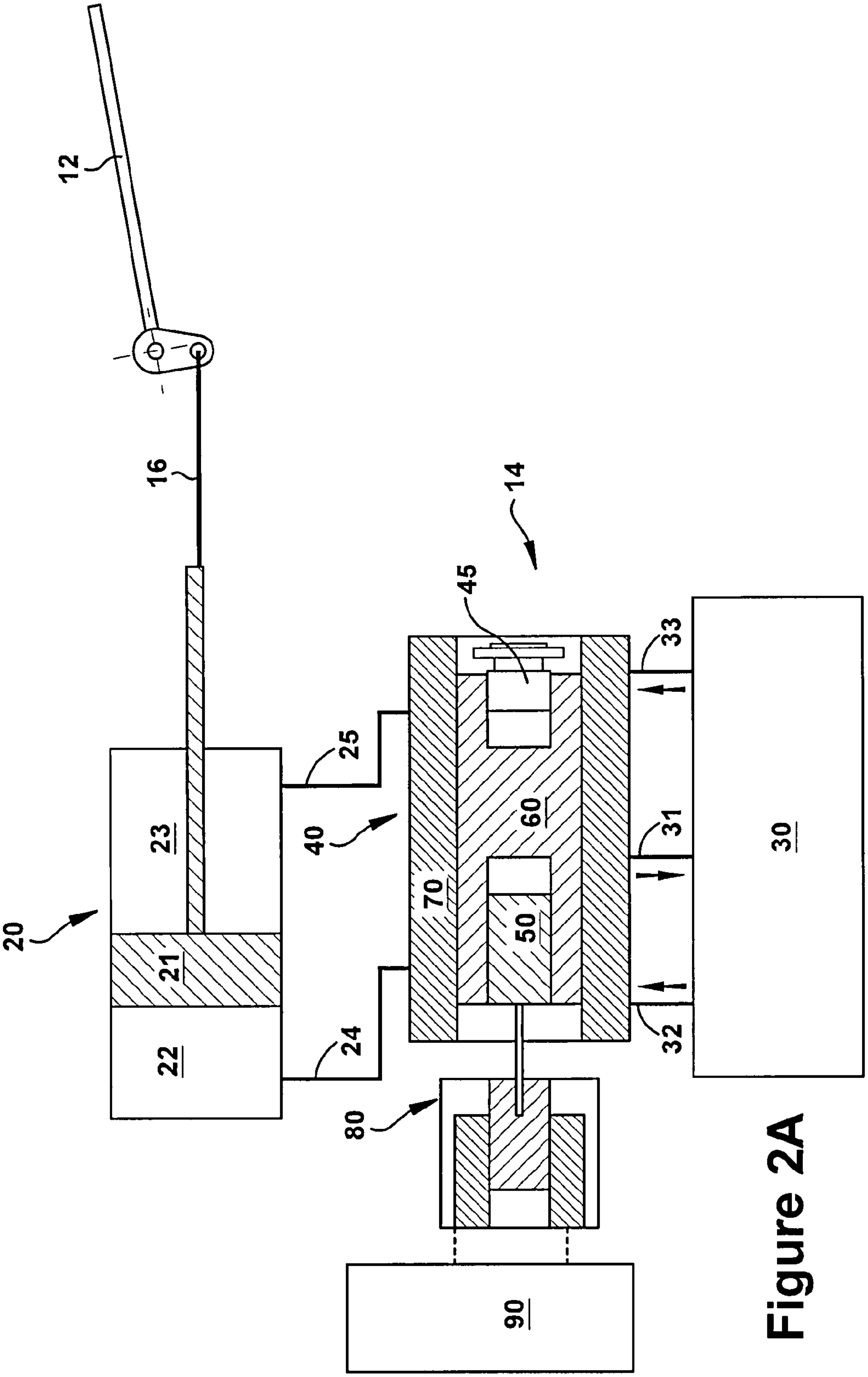
Figure 2B:
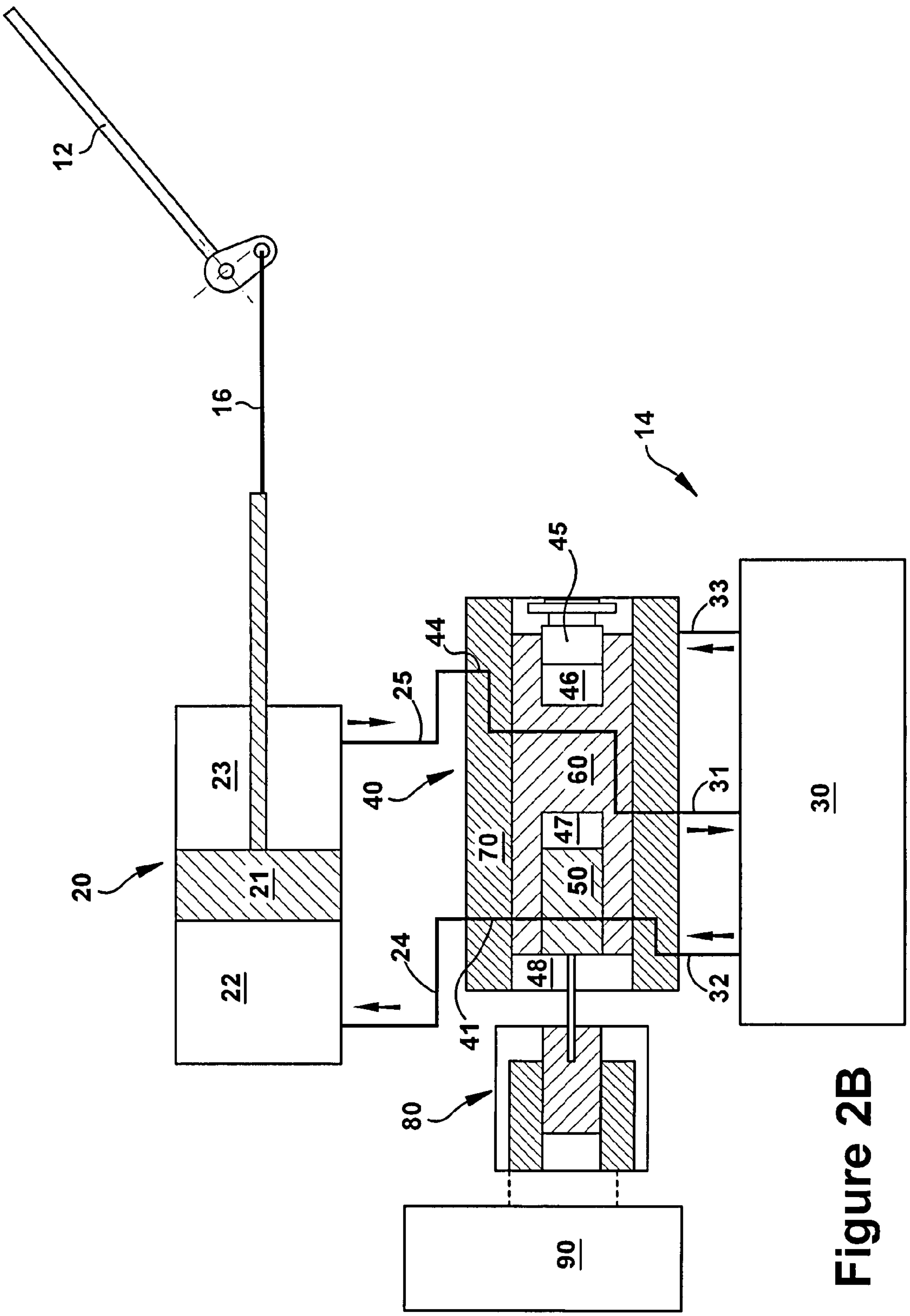
Figure 2C:
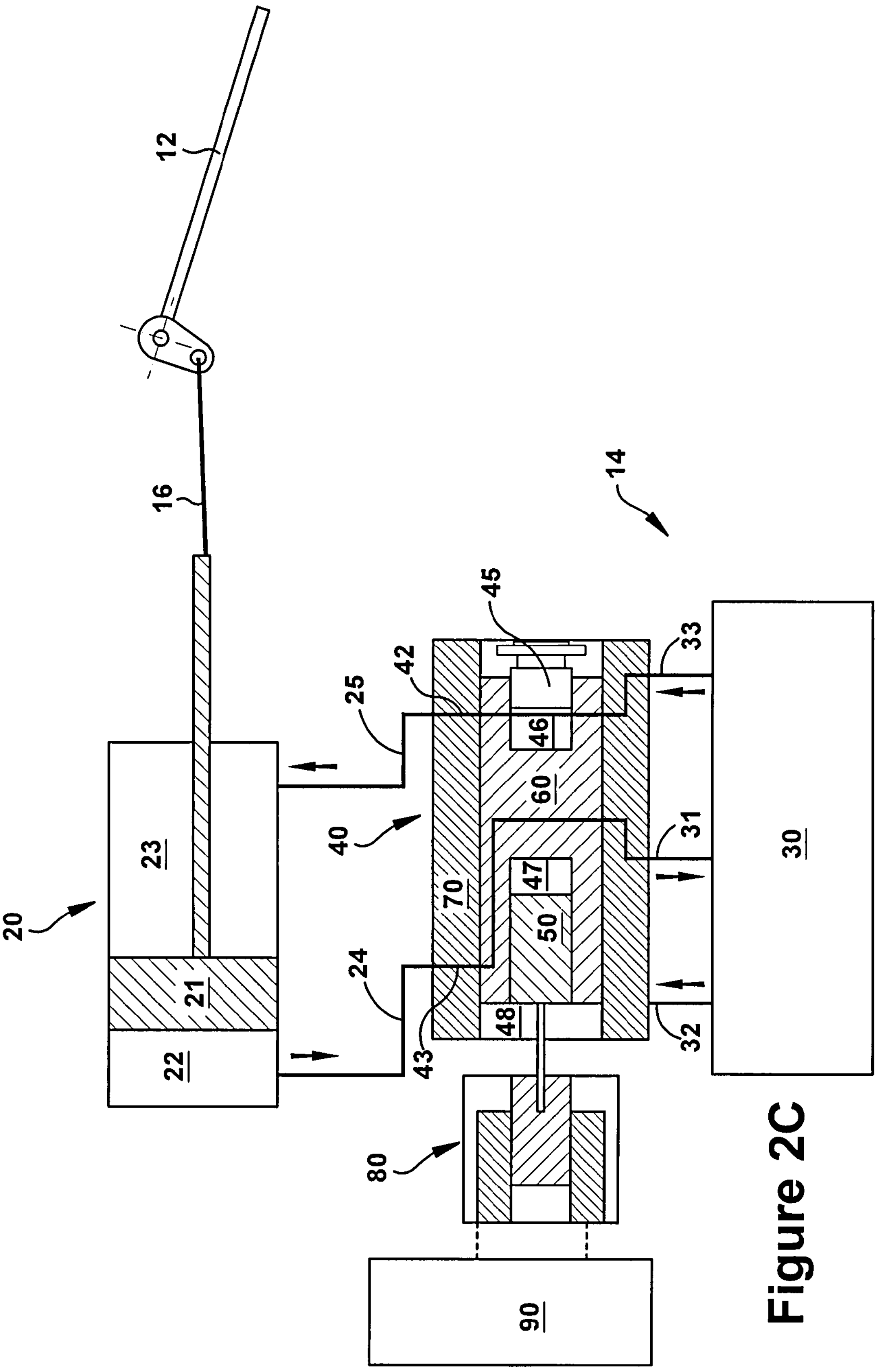

As shown in FIGS. 2A-2C, an actuating system 14 can be mechanically coupled to an arm 16 or other linkage connected to the flight-control component 12. The system 14 is adapted to predictably move the arm 16, and thus the flight-control-surface component 12. To this end, the actuating system 14 can comprise a cylinder assembly 20, a fluid source 30, a valve assembly 40 (including an inner spool 50, an outer spool 60, and a sleeve 70), a drive assembly 80, and a control assembly 90.

The cylinder assembly 20 comprises a piston 21, cylinder chambers 22 and 23 on either side of the piston 21, and lines 24 and 25 communicating with the chambers 22 and 23. The piston 21 is operable coupled to the arm 16 whereby the component 12 is moved upon extension or retraction of the piston 21. The fluid source 30 can be any suitable source or sink of control fluid and it can have a return line 31 and supply lines 32 and 33.

The valve assembly 40 is adapted to open and close flow paths from the fluid source 30 to the cylinder assembly 20. These flow paths can include a supply flow path 41 from the first supply line 32 to the first cylinder chamber 22 (FIG. 2B), a supply flow path 42 from the second supply line 33 to the second cylinder chamber 23 (FIG. 2C), a return flow path 43 from the first cylinder chamber 22 to the return line 31 (FIG. 2C), and a return flow path 44 from the second cylinder chamber 23 to the return line 31 (FIG. 2B). A plunger 45 can be situated at the non-drive axial end of the outer spool 60.

The valve assembly 40 is operable to close all four flow paths 41-44. In this operating condition, there is essentially no communication between the fluid source 30 and the cylinder assembly 20 (FIG. 2A). The piston 21, and thus the arm 16 and the control surface 12, remain in a selected position.

The valve assembly 40 is also operable to open the supply flow path 41 to the first cylinder chamber 22 and to open the return flow path 44 from the second cylinder chamber 23 (FIG. 2B). When these flow paths are opened, the supply flow path 42 (to the second cylinder chamber 23) and the return flow path 43 (from the first cylinder chamber 22) are closed. In this operating condition, fluid is introduced to the chamber 22 and released from the chamber 23. This causes the piston 21 to move in a first direction (e.g., rightward in the illustrated orientation) and move the control surface 12 in a corresponding manner.

The valve assembly 40 is further operable to open the supply flow path 42 to the second cylinder chamber 23 and to open a return flow path 43 from the first cylinder chamber 22.

(FIG. 2C.) When the flow paths 42 and 43 are open, the first supply flow path 41 and the second return flow path 44 are closed. In this operating condition, fluid is introduced to the chamber 23 and released from the chamber 22, causing the piston 21 to move in a second opposite direction (e.g., leftward in the illustrated orientation) and correspondingly move the control surface 12.

The opening/closing of the flow paths 41-44 within the valve assembly 40 is achieved by relative movement of the spools 50 and 60 within the sleeve 70. More specifically, the control assembly 90 energizes (i.e., provides current to) and/or deenergizes (i.e., cuts off current from) the drive assembly 80 to move the inner spool 50 relative to the outer spool 60. And this inner-spool movement causes the outer spool 60 to move relative to the sleeve 70 to open/close the flow paths 41-44, due to force imbalances created by fluid pressure on faces 46, 47, and 48.

Figure 3:
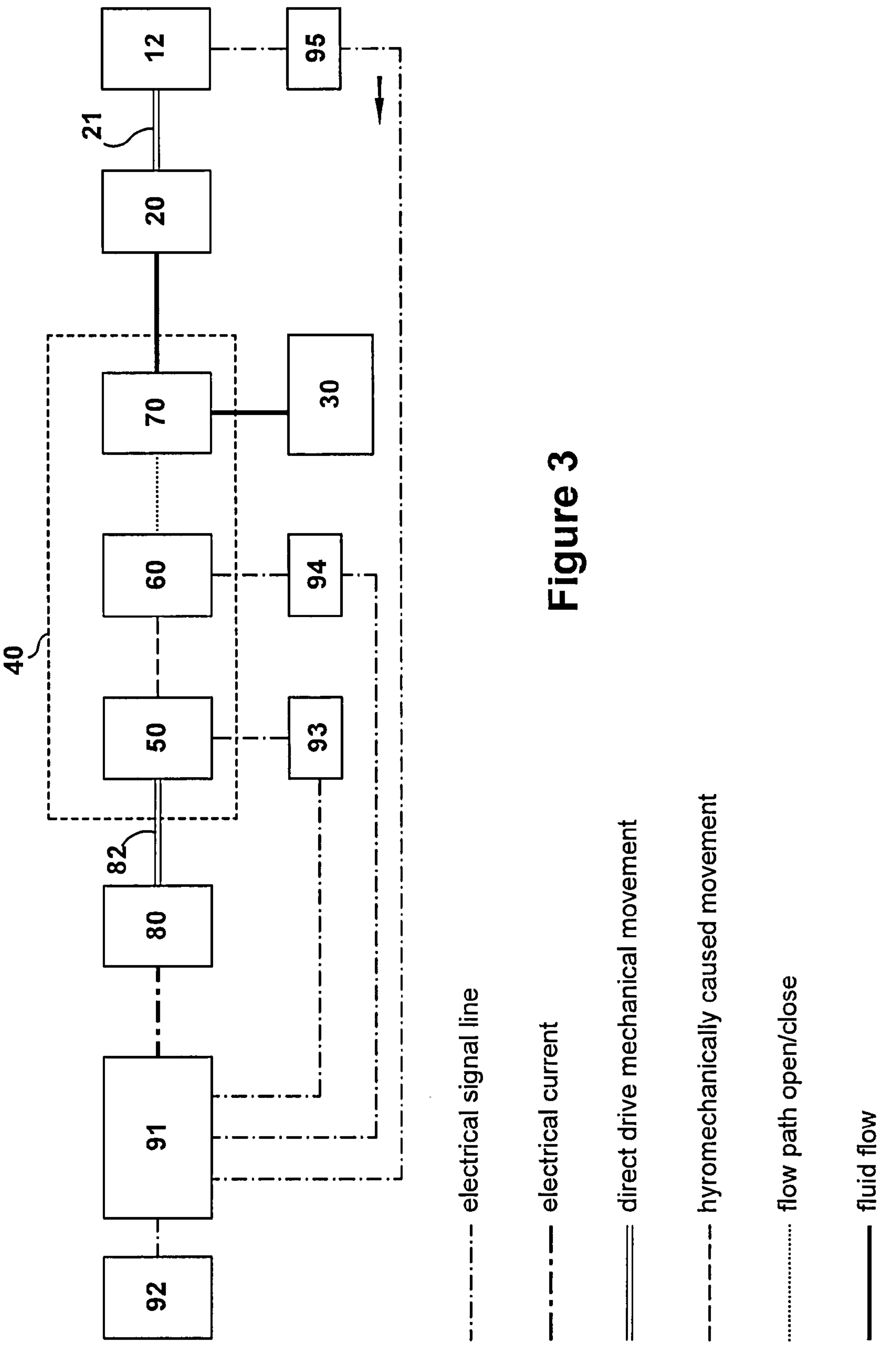
FIG. 3 is a schematic diagram of the actuator system.

As best seen by referring additionally to FIG. 3, the control assembly 90 can comprise a controller 91 that provides current to the drive assembly 80. The drive assembly converts this current into mechanical motion for direct driving of the inner spool 50 in a corresponding direction. In other words, the linear motion of the relevant component of the drive assembly 80 (namely armature 82 introduced below) directly translates to the inner spool 50, without amplification.

The inner-spool movement motivated by the drive assembly 80 re-situates the inner spool 50 relative to the outer spool 60 thereby creating hydromechanical forces as the result of fluid pressure placed on faces 46, 47 and 48. These forces cause the outer spool 60 to move relative to the sleeve 70 causing flow paths 41-44 to open/close thereby introducing and releasing fluid from the cylinder assembly 20. The introduction/release of cylinder fluid results in the piston 21 moving the arm 16 and/or control surface 12.

The controller 91 can receive, via electrical lines, signals from an input panel 92, a first-spool-position sensor 93, a second-spool-position sensor 94, and a control-surface position sensor 95. The input panel 92 allows selective input of a desired control-surface position from, for example, instrumentation in the cockpit.

The sensors 93, 94, 95 can provide realtime positional data of the spools 50, 60 and the control surface 12, so that current can be accordingly regulated to situate the control surface 12 in the desired position. In other words, instead of the inner spool's position being assumed based on the current provided to the drive assembly 80, current is regulated until the sensor 93 indicates that the inner spool 50 has been shifted to the correct location. In this sense, the valve assembly 40, and/or perhaps more accurately the drive assembly 80, can be viewed as "proportional" as current will vary to match that necessary to achieve a commanded position.

Figure 4:
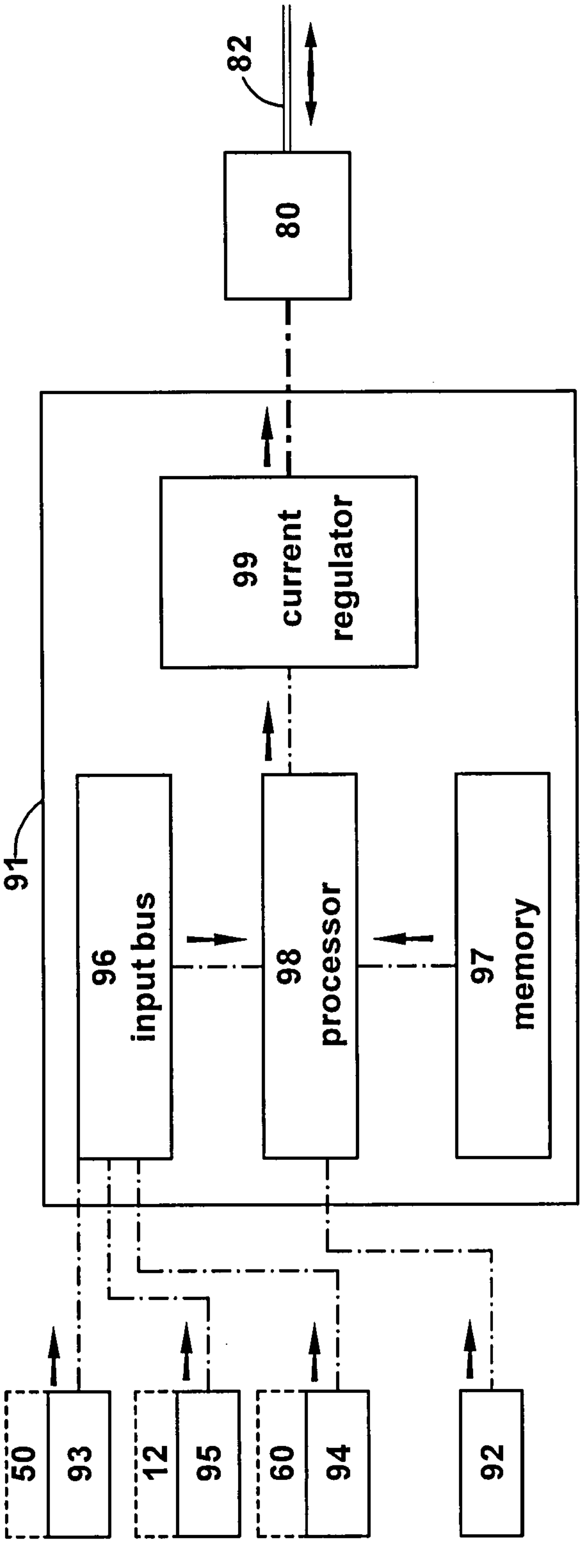
FIG. 4 is a schematic diagram of the control assembly of the actuator system.

The control assembly 90 is diagramed in more detail in FIG. 4. The controller 91 can comprise, for example, an input bus 96, a memory 97, a processor 98, and a current regulator 99. The input bus 96 collects and deciphers data signals from the positional sensors 93, 94, 95. The memory 97 includes calibration data (e.g., generated during the manufacturing process) regarding predetermined positions of the control surface 12, the inner spool 50, and/or the outer spool 60.

During operation of the actuator system 14, a desired position of the control surface 12 can be commanded through the input panel 92. The processor 98 receives this command and, based thereon, provides current through the regulator 99 to the drive assembly 80. The processor 98 receives feedback through the sensors 93, 94, and 95 regarding the actual position of the control surface 12, the inner spool 50, and the outer spool 60. The sensed positions are compared to those stored in memory and current is regulated (by the regulator 99) accordingly.

The memory 97 can also include approximate current and/or duration values for certain predetermined positions, and the processor 98 can use these as initial settings to reach commanded positions. But the actuator system 14 does not rest upon these values, and instead applies an almost iterative approach by relying upon realtime position data (provided by the sensors 93, 94, and 95) to regulate current. In this manner, inconsistencies inherent in current-only settings are erased from the actuator system 14.

Figure 5:
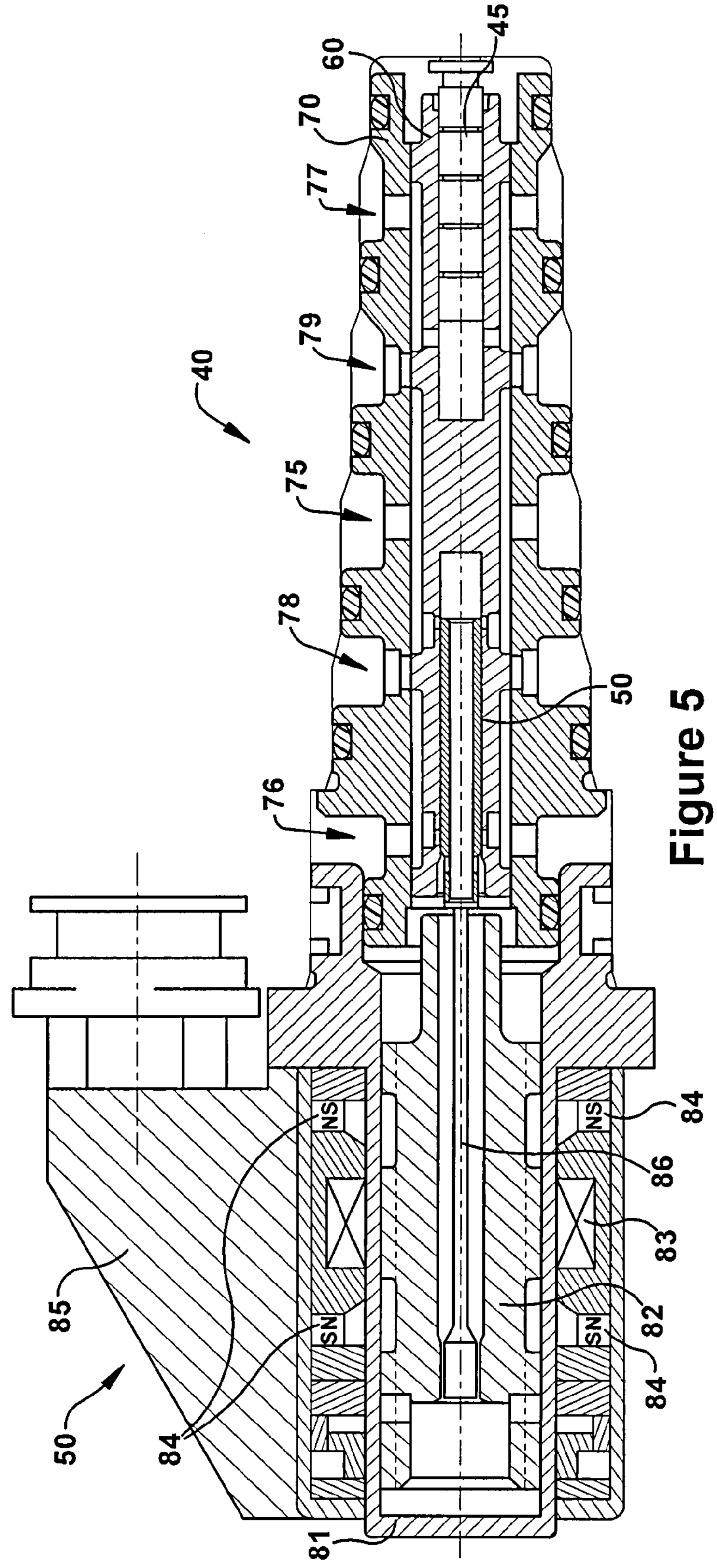
FIG. 5 is a cross-sectional view of the valve assembly of the actuator assembly.

The valve assembly 40 and the drive assembly 80 are shown isolated from the rest of the actuator system 14 in FIG. 5. Turning first to the drive assembly 80, it can comprise a bobbin 81 and an armature 82 positioned for lateral movement within the bobbin 81. An electrical coil 83 surrounds the bobbin 81 and is sandwiched between two ring magnets 84. Current is supplied to the coil 83 (e.g., via wires extending through conduit 85) to create a flux that biases the magnetic equilibrium of the armature 82. Bias in one direction displaces the armature 82 in a first direction (e.g., rightward in the illustrated orientation) and bias in an opposite direction displaces the armature 82 in a second direction (e.g., leftward in the illustrated orientation). The armature 82 includes a rod 86 having a distal end joined to the inner spool 50. Thus, a linear displacement of the rod 86 directly drives the inner spool 50.

Figure 6:
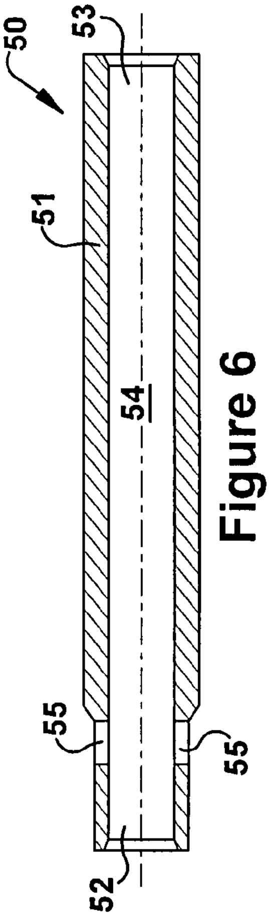
FIG. 6 is a cross-sectional view of an inner spool of the valve assembly.

The inner spool 50, shown alone in FIG. 6, comprises a cylindrical wall 51 with an open axial end 52 (adjacent the drive assembly 80), an open axial end 53 (adjacent the plunger 45), and an axial bore 54 running therethrough. A passage 55 extends radially through the cylindrical wall 51 into the bore 54.

Figure 7:
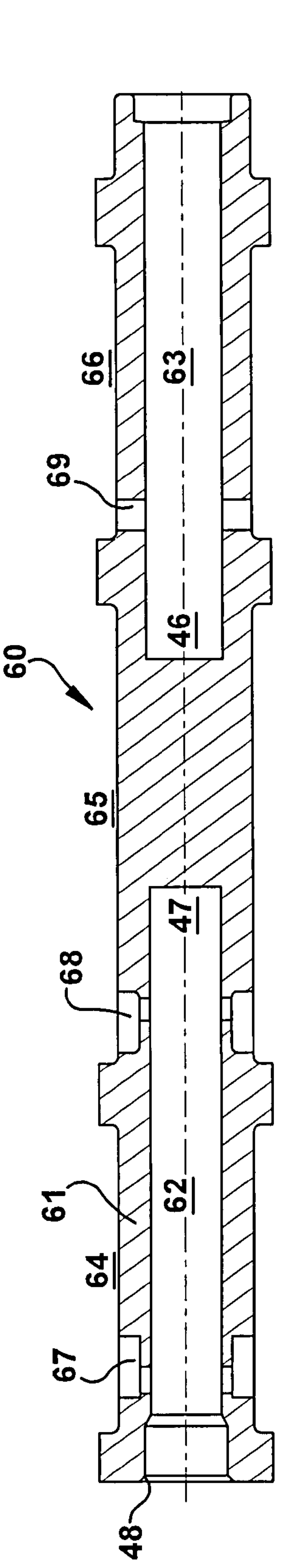
FIG. 7 is a cross-sectional view of an outer spool of the valve assembly.

The outer spool 60, shown alone in FIG. 7, comprises a cylindrical tube 61 having axial bores 62 and 63 at opposite ends thereof. The outer cylindrical surface of the tube 61 has circumferential grooves 64, 65, and 66. A passage 67 extends radially from the groove 64 to the bore 62, a passage 68 extends radially from the groove 65 to the bore 62, and a passage 69 extends radially from the groove 66 to the bore 63. The outer spool 60 also forms the valve's faces 46, 47 and 48 that cause hydromechanical movement of the spool 60 within the sleeve 70. In the illustrated spool 60, for example, the closed (drive-adjacent) axial end of the bore 63 forms the face 46, the closed (plunger-adjacent) axial end of the bore 62 forms the face 47, and the rim surrounding the open (drive-end) axial end of the bore 62 forms the face 48.

Figure 8:
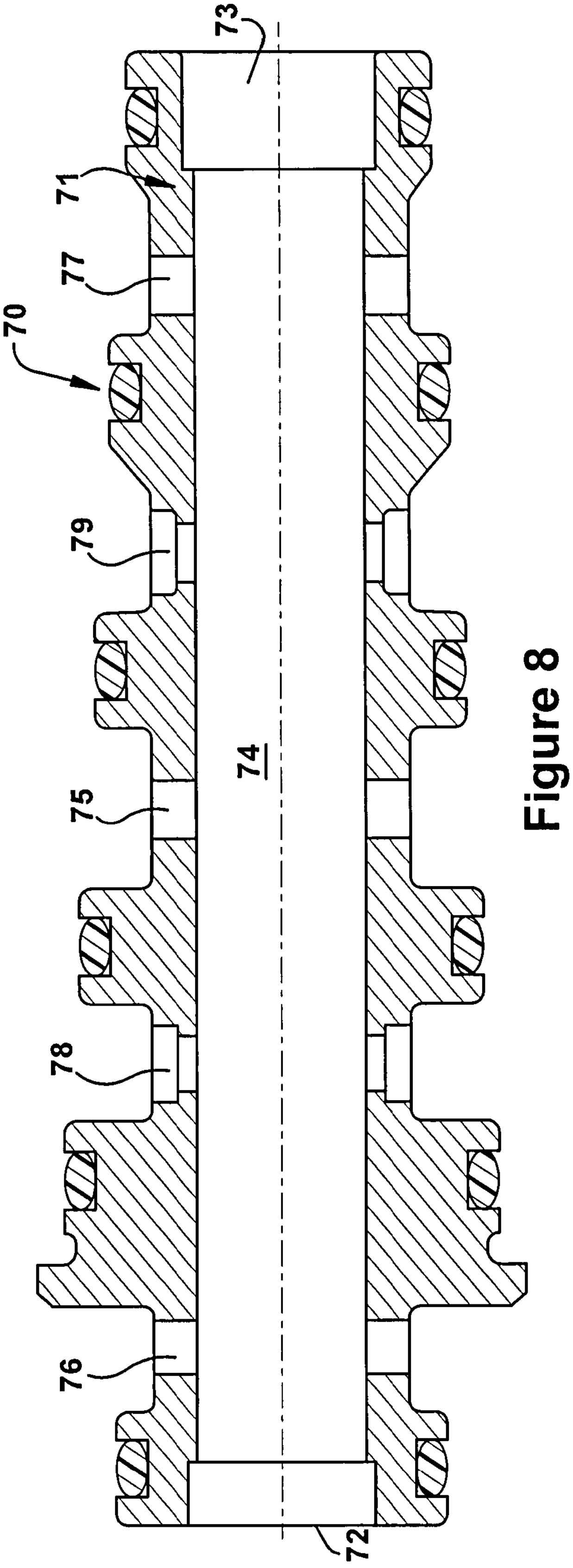
FIG. 8 is a cross-sectional view of a sleeve of the valve assembly.

The sleeve 70, shown alone in FIG. 8, comprises a cylindrical wall 71, having an axial end 72 (adjacent the drive assembly 80), an axial end 73 (adjacent the plunger 45), and a central bore 74 extending therethrough. The sleeve 70 comprises a return port 75, a first supply port 76, a second supply port 77, a first cylinder port 78, and a second cylinder port 79 extend radially through the cylindrical wall 71 to the central bore 74. In the illustrated valve assembly 40, the ports are arranged with the return port 75 in the middle, the first supply port 76 closest to the drive end 72, and the second return port 77 remotest from the drive end 72. The first cylinder port 78 is situated between the first supply port 76 and the return port 75, and the second cylinder port 79 is situated between the second supply port 77 and the return port 75.

Figure 9:
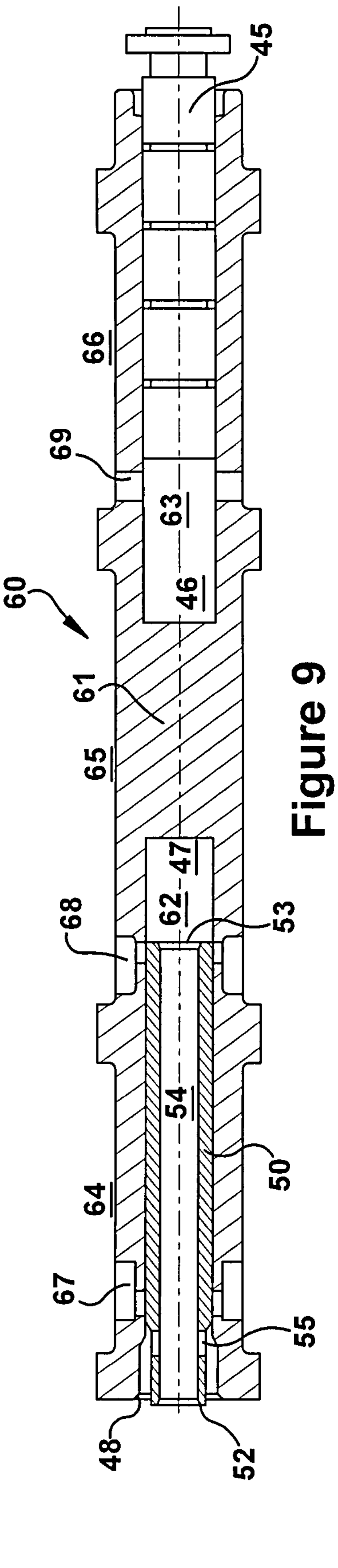
FIG. 9 is a cross-sectional view of the inner spool situated within the outer spool (without the sleeve).
Figure 10:
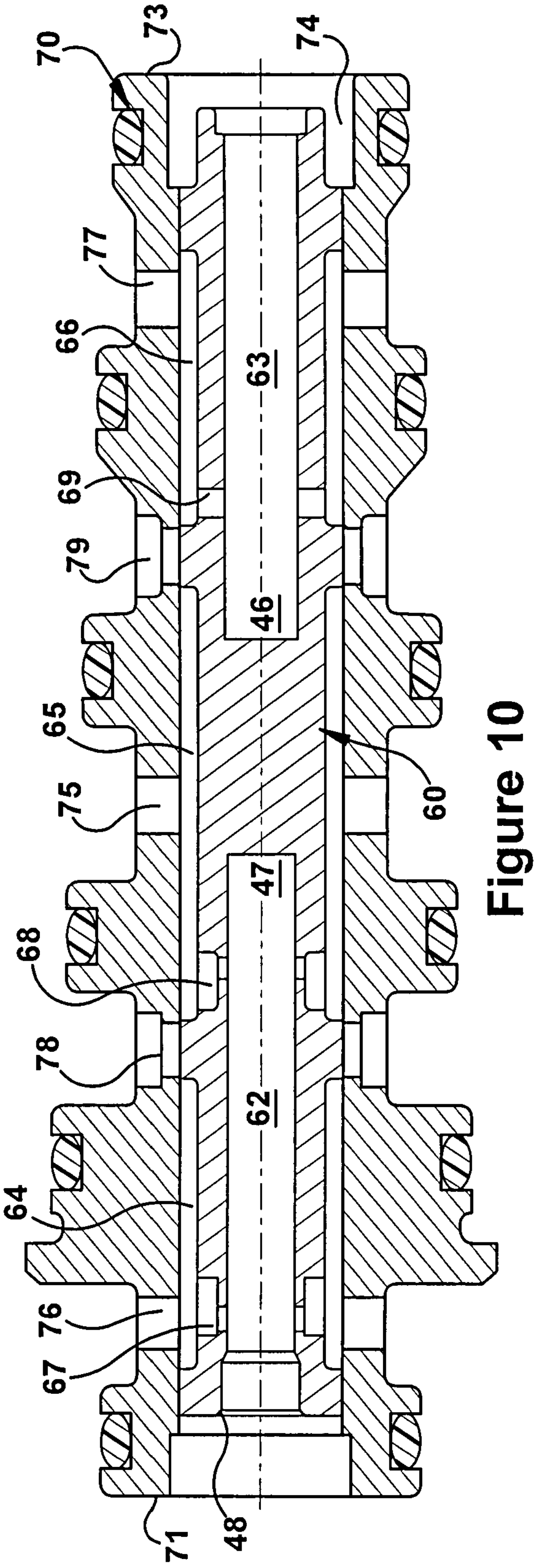
FIG. 10 is a cross-sectional view of the outer spool situated within the sleeve (without the inner spool).

In the assembled valve 40, the inner spool 50, the outer spool 60, and the sleeve 70 are coaxially situated relative to each other. (FIG. 5.) More specifically, the inner spool 50 is situated within the drive-end axial bore 62 of the outer spool 60 and linearly moveable therewithin. (See FIG. 9.) (The plunger 45 is situated within the outer spool's other axial bore 63.) The outer spool 60 is situated within the central bore 74 of the sleeve 70 and is linearly moveable therewithin (See FIG. 10).

Referring now to FIGS. 11A-11C and FIGS. 12A-12C, the valve assembly 40 is schematically shown converting from a rest condition to a piston-extend condition and a piston-retract condition, respectively.

In the rest condition (FIGS. 11A and 12A), the piston-extend condition (FIG. 11C), the piston-retract condition (FIG. 12C), and intermediate stages thereof (FIGS. 11B and 12B), the second supply port 77 communicates with the outer-spool groove 66. The outer-spool groove 66 communicates with the radial passage 69, and the radial passage 69 communicates with the plunger-end bore 63 of the outer spool 60. Thus, the outer-spool bore 63 is continuously filled with supply fluid from the second supply line 33 (FIGS. 2A-2C). The fluid-created pressure on the closed axial face 46 of the plunger-end bore 63 urges the outer spool 60 in the second (e.g., leftward) direction.

In the rest condition (FIGS. 11A and 12A), the sleeve return port 75 communicates with the outer-spool groove 65 (and thus the radial passage 68), but the outer-spool passage 68 is blocked from the drive-end bore 62 by the inner spool 50. The sleeve's first supply port 76 communicates with the outer-spool groove 64 (and thus the radial passage 67), but the radial passage 67 is blocked from the bore 62 by the inner spool 50. The cylinder ports 78 and 79 are blocked by the outer spool 60 and do not communicate with any of the outer-spool grooves 64-66. This valve condition corresponds to that shown in FIG. 2A.

Figures 11A, 11B, 11C:
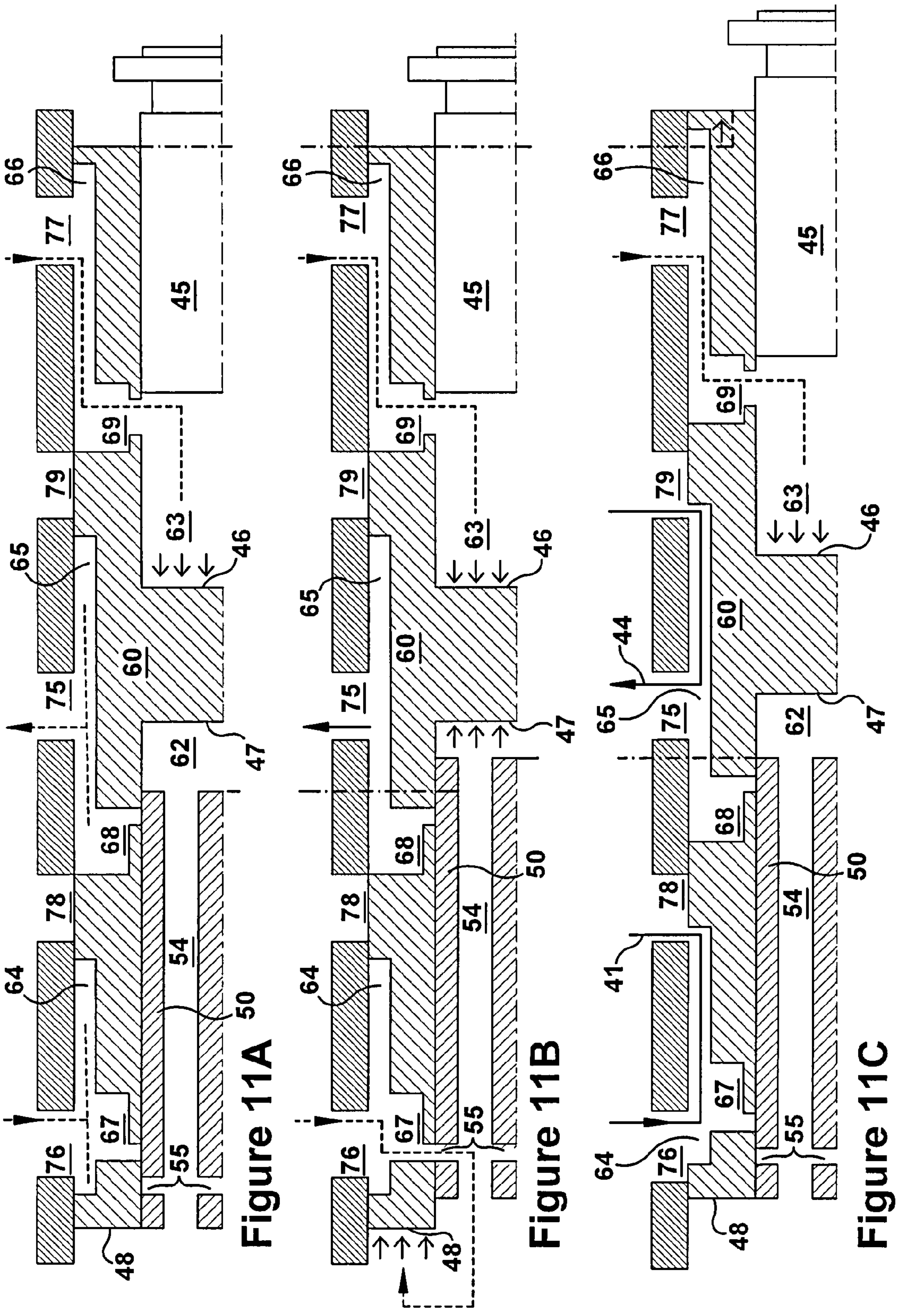
FIGS. 11A-11C are schematic diagrams outlining sequential spool positions when the valve assembly is driven in a first direction.

To convert the valve assembly 40 to a piston-extend condition, the inner spool 50 is driven in the first (e.g., rightward) direction. (FIG. 11B.) The outer spool 60 initially remains stationary (as it is not directly driven), whereby the sleeve return port 75 does not communicate its drive-end bore 62. (More particularly, the outer spool's radial passage 68 is blocked by inner sleeve 50.) The cylinder ports 78 and 79 are still blocked by the outer spool 60 and do not communicate with any of the outer-spool grooves 64-66.

The direct drive of the inner spool 50 in the first direction (while the outer spool 60 remains stationary) aligns the inner-spool radial passage 55 with the outer-spool radial passage 67. This inter-spool-passage alignment results in the inner-spool bore 54 communicating with the sleeve's first supply port 76 (via the groove 64 and the radial passage 67). The outer-spool bore 62 is thereby filled with fluid from the second supply line 32 (FIGS. 2A-2C). The so-supplied fluid within the outer-spool bore 62 creates pressure on its closed axial face 47, and also on the rim face 48 surrounding the bore's open axial end, that urges the outer spool 60 in the first (e.g., rightward) direction. The opposite-direction pressures on the end faces 46 and 47 essentially cancel each other out, whereby the pressure on the rim face 48 causes a force imbalance.

The force imbalance within the sleeve 70 hydromechanically causes the outer spool 60 to move in the first (e.g., rightward) direction while the inner spool 50 remains stationary. (FIG. 11C.)

The outer spool's movement in the first direction misaligns the radial passage 55 (in the inner spool 50) and the radial passage 67 (in the outer spool 60). As such, communication between the first supply port 76 and the bore 62 is closed, and motion of the outer spool 60 will cease. The outer spool's position relative to the sleeve 70 opens the flow path 41 from the sleeve's first supply port 76 (through the groove 64) to the first cylinder port 78. It also opens the flow path 44 from the second cylinder port 79 (through the groove 65) to the sleeve's return port 75. This valve condition corresponds to that shown in FIG. 2B, with fluid being introduced to the first cylinder chamber 22 and released from the second cylinder chamber 23.

Figures 12A, 12B, 12C:
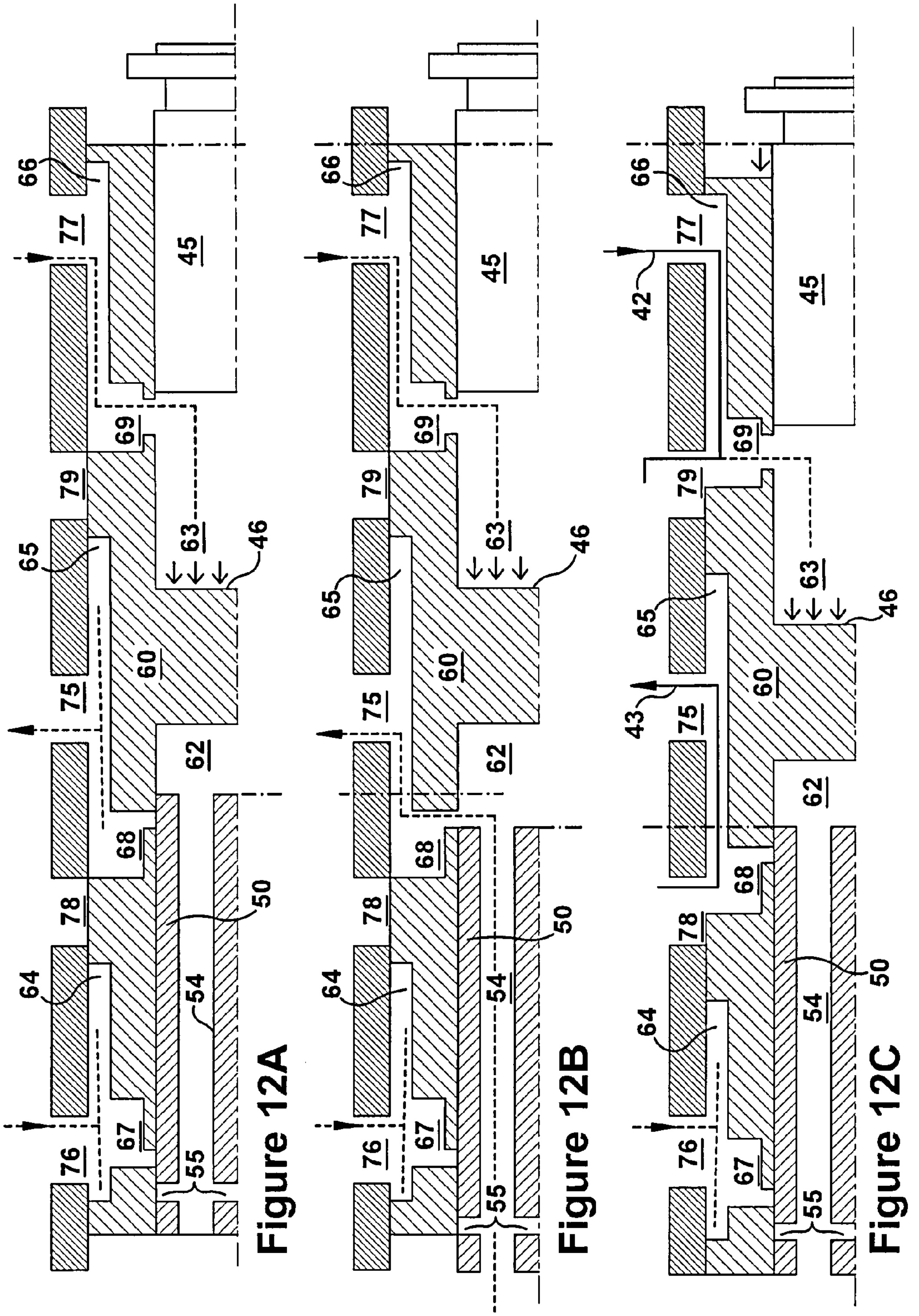
FIGS. 12A-12C are schematic diagrams outlining sequential spool positions when the valve assembly is driven in a second direction.

To convert the valve assembly 40 to a piston-retract condition, the inner spool 50 is driven in a second (e.g., leftward) direction while the non-driven outer spool 60 remains stationary. (FIG. 12B.) The sleeve return port 75 does not communicate the outer-spool bore 62, and the cylinder ports 78 and 79 do not communicate with any of the outer-spool grooves 64-66.

The second-direction-inner-spool movement opens the radial passage 68 in the outer spool 60 for communication with the bore 62. The outer-spool bore 62 thereby communicates with the sleeve's return port 75 (via the groove 65) whereby fluid can be released therefrom. This allows the pressure forces on the end face 46 to push the outer spool 60 in the second (e.g., rightward) direction, until the inner spool 60 once again closes the radial passage 68. (FIG. 12C.) The outer spool's position relative to the sleeve 70 opens the flow path 42 from the sleeve's second supply port 77 (through the groove 66) to the second cylinder port 79. It also opens the flow path 43 from the first cylinder port 78 (through the groove 65) to the sleeve's return port 75. This valve condition corresponds to that shown in FIG. 2C, with fluid being introduced to the second cylinder chamber 23 and released from the first cylinder chamber 22.

One may now appreciate that the actuator system 14 can consistently and dependably perform in a variety of operating conditions, without the penalty of excessive weight and/or size. Although the actuator system 14, the cylinder assembly 20, the fluid source 30, the valve assembly 40, the drive assembly 80, and/or the control assembly 90, have been shown and described with respect to certain embodiments, equivalent alterations and modifications should occur to others skilled in the art upon review of this specification and drawings. If an element (e.g., component, assembly, system, device, composition, method, process, step, means, etc.), has been described as performing a particular function or functions, this element corresponds to any functional equivalent (i.e., any element performing the same or equivalent function) thereof, regardless of whether it is structurally equivalent thereto. And while a particular feature may have been described with respect to less than all of the embodiments, such feature can be combined with one or more other features of the other embodiments.

The invention claimed is:

1. A valve system comprising a valve assembly, a drive assembly, and a control assembly; wherein:

the valve assembly comprises an inner spool, an outer spool, and a sleeve, the inner spool being situated within the outer spool, and the outer spool being situated within the sleeve;

the drive assembly directly drives the inner spool to move axially relative to the outer spool;

the outer spool is hydromechanically caused to move axially relative to the sleeve upon movement of the inner spool, thereby opening/closing flow paths between ports in the sleeve;

the control assembly provides current input to the drive assembly;

the drive assembly converts current input into mechanical motion, proportional and directional to the current input, to directly drive the inner spool; and the control assembly senses positions of the inner spool and regulates current input in accordance with the sensed inner-spool positions.

2. A valve system as set forth in claim 1, wherein the control assembly comprises a memory having calibrated positional data stored therein and a processor, that compares the sensed inner-spool positions with the calibrated positional data and adjusts the current input accordingly.

3. A valve system as set forth in claim 1, wherein the drive assembly comprises an armature connected to the inner spool, and wherein current input to the drive assembly creates a magnetic bias in the armature that displaces it in a first direction or second direction, and this displacement directly drives the inner spool.

4. A valve system as set forth in claim 1, wherein the inner spool is directly driven within an axial bore of the outer spool among a rest position, a first position removed from the rest position in a first direction, and a second position removed from the rest position in a second direction;

wherein the outer spool is movable within an axial bore of the sleeve; among a rest position, a first position removed from the rest position in a first direction, and a second position removed from the rest position in a second direction;

wherein, when the inner spool is in its rest position, the outer spool is hydromechanically caused to move to and remain in its rest position;

wherein, when the inner spool is directly driven from its rest position to its first position, the outer spool is hydromechanically caused to move to and remain in its first position; and wherein, when the inner spool is directly driven from its rest position to its second position, the outer spool is hydromechanically caused to move to and remain in its second position.

5. A valve system as set forth in claim 4, wherein the outer spool comprises a cylindrical wall surrounding its axial bore, a first radial passage through the cylindrical wall to the axial bore, and a second radial passage through the cylindrical wall to the axial bore; and wherein:

when the inner spool and the outer spool are in their rest positions, the inner spool blocks communication through the first radial passage to the axial bore of the outer spool and blocks communication through the second radial passage to the axial bore of the outer spool;

when the inner spool and the outer spool are in their first positions, the inner spool blocks communication through the first radial passage to the axial bore of the outer spool and blocks communication through the second radial passage to the axial bore of the outer spool;

when the inner spool and the outer spool are in their second positions, the inner spool blocks communication through the first radial passage to the axial bore of the outer spool and blocks communication through the second radial passage to the axial bore of the outer spool;

when the outer spool is in its rest position and the inner spool is directly driven to its first position, the inner spool allows communication through the first radial passage to the axial bore of the outer spool and blocks communication through the second radial passage to the axial bore of the outer spool, and fluid flows through the first radial passage creating hydromechanical forces causing the outer spool to move to its first position; and when the outer spool is in its rest position and the inner spool is directly driven to its second position, the inner spool blocks communication through the first radial passage to the axial bore of the outer spool and allows communication through the second radial passage to the axial bore of the outer spool, and fluid flows through the second radial passage creating hydromechanical forces causing the outer spool to move to its second position.

6. A valve system as set forth in claim 1, wherein the sleeve comprises at least one supply port, at least one return port, a first cylinder port, and a second cylinder port, and wherein the outer spool connects or disconnects flow paths between the supply port(s) and the cylinder ports, and connects or disconnects flow paths between the cylinder ports and the return port(s).

7. A valve system as set forth in claim 6, wherein when outer spool is movable relative to an axial bore of the sleeve among a rest position, a first position removed from the rest position in a first direction, and a second position removed from the rest position in a second direction; and wherein:

when the outer spool is in its rest position, the flow path between the first cylinder port and the supply port is disconnected, the flow path between the first cylinder port and the return port is disconnected, the flow path between the second cylinder port and the supply port is disconnected, and the flow path between the second cylinder port and the return port is disconnected; and when the outer spool is in its first position, the flow path between the first cylinder port and the supply port is connected, the flow path between the first cylinder port and the return port is disconnected, the flow path between the second cylinder port and the supply port is disconnected, and the flow path between the second cylinder port and the return port is connected.

8. A valve system as set forth in claim 7, wherein the outer spool has circumferential grooves that extend between the sleeve's ports to connect flow paths when the outer spool is in its first position and in its second position.

9. A valve system as set forth in claim 8, wherein the sleeve comprises a common return port, a first supply port, and a second supply port, wherein, when the outer spool is in its first position, the flow path between the first supply port and the first cylinder port is connected, and the flow path between the second cylinder port and the return port is connected; and wherein, when the outer spool is in its second position, the flow path between the second supply port and the second cylinder port is connected, and the flow path between the first cylinder port and the return port is connected.

10. A valve system as set forth in claim 8, wherein the inner spool is directly driven within an axial bore of the outer spool among a rest position, a first position removed from the rest position in a first direction, and a second position removed from the rest position in a second direction;

wherein, when the inner spool is in its rest position, the outer spool is hydromechanically caused to move to and remain in its rest position;

wherein, when the inner spool is directly driven from its rest position to its first position, the outer spool is hydromechanically caused to move to and remain in its first position; and wherein, when the inner spool is directly driven from its rest position to its second position, the outer spool is hydromechanically caused to move to and remain in its second position.

11. A valve system as set forth in claim 10, wherein the outer spool comprises a cylindrical wall surrounding its axial bore, a first radial passage through the cylindrical wall to the axial bore, and a second radial passage through the cylindrical wall to the axial bore; and wherein:

when the inner spool and the outer spool are in their rest positions, the inner spool blocks communication through the first radial passage to the axial bore of the outer spool and blocks communication through the second radial passage to the axial bore of the outer spool;

when the inner spool and the outer spool are in their first positions, the inner spool blocks communication through the first radial passage to the axial bore of the outer spool and blocks communication through the second radial passage to the axial bore of the outer spool;

when the inner spool and the outer spool are in their second positions, the inner spool blocks communication through the first radial passage to the axial bore of the outer spool and blocks communication through the second radial passage to the axial bore of the outer spool;

when the outer spool is in its rest position and the inner spool is directly driven to its first position, the inner spool allows communication through the first radial passage to the axial bore of the outer spool and blocks communication through the second radial passage to the axial bore of the outer spool, and fluid flows through the first radial passage creating hydromechanical forces causing the outer spool to move to its first position; and when the outer spool is in its rest position and the inner spool is directly driven to its second position, the inner spool blocks communication through the first radial passage to the axial bore of the outer spool and allows communication through the second radial passage to the axial bore of the outer spool, and fluid flows through the second radial passage creating hydromechanical forces causing the outer spool to move to its second position.

12. A valve system as set forth in claim 6, in combination with a cylinder assembly comprising a piston, a first cylinder chamber on one side of the piston, and a second cylinder chamber on the other side of the piston, and wherein the sleeve's first cylinder port is fluidly connected to the first cylinder chamber and the sleeve's second cylinder port is fluidly connected to the second cylinder chamber.

13. A combination as set forth in claim 12, wherein the piston is mechanically coupled to a control surface component.

14. A combination as set forth in claim 13, installed on an aircraft having a control surface component, and wherein the piston is mechanically coupled to the control surface component.

15. A valve system as set forth in claim 1, wherein the control assembly comprises a memory having calibrated positional data stored therein and a processor, that compares the sensed inner-spool positions with the calibrated positional data and adjusts the current input accordingly; and wherein the drive assembly comprises an armature connected to the inner spool, and wherein current input to the drive assembly creates a magnetic bias in the armature that displaces it in a first direction or second direction, and this displacement directly drives the inner spool.

16. A valve system as set forth in claim 15, wherein the inner spool is directly driven within an axial bore of the outer spool among a rest position, a first position removed from the rest position in a first direction, and a second position removed from the rest position in a second direction;

wherein the outer spool is movable within an axial bore of the sleeve; among a rest position, a first position removed from the rest position in a first direction, and a second position removed from the rest position in a second direction;

wherein, when the inner spool is in its rest position, the outer spool is hydromechanically caused to move to and remain in its rest position;

wherein, when the inner spool is directly driven from its rest position to its first position, the outer spool is hydromechanically caused to move to and remain in its first position; and wherein, when the inner spool is directly driven from its rest position to its second position, the outer spool is hydromechanically caused to move to and remain in its second position.

17. A valve system as set forth in claim 1, wherein the control assembly comprises a memory having calibrated positional data stored therein and a processor, that compares the sensed inner-spool positions with the calibrated positional data and adjusts the current input accordingly; and wherein the inner spool is directly driven within an axial bore of the outer spool among a rest position, a first position removed from the rest position in a first direction, and a second position removed from the rest position in a second direction; and wherein the outer spool is movable within an axial bore of the sleeve; among a rest position, a first position removed from the rest position in a first direction, and a second position removed from the rest position in a second direction.

18. A valve system as set forth in claim 17, wherein, when the inner spool is in its rest position, the outer spool is hydromechanically caused to move to and remain in its rest position;

wherein, when the inner spool is directly driven from its rest position to its first position, the outer spool is hydromechanically caused to move to and remain in its first position; and wherein, when the inner spool is directly driven from its rest position to its second position, the outer spool is hydromechanically caused to move to and remain in its second position.

19. A valve system as set forth in claim 1, wherein the inner spool is directly driven within an axial bore of the outer spool among a rest position, a first position removed from the rest position in a first direction, and a second position removed from the rest position in a second direction; and wherein the drive assembly comprises an armature connected to the inner spool, and wherein current input to the drive assembly creates a magnetic bias in the armature that displaces it in a first direction or second direction, and this displacement directly drives the inner spool from the rest position to the first position and the second position, respectively.

20. A valve system as set forth in claim 19, wherein the outer spool is hydromechanically caused to move within an axial bore of the sleeve; among a rest position, a first position removed from the rest position in a first direction, and a second position removed from the rest position in a second direction.

* * * * *